June 15, 1926.
A. P. BALL
1,588,514
ELECTRICAL SYSTEM
Filed August 1, 1918    2 Sheets-Sheet 1
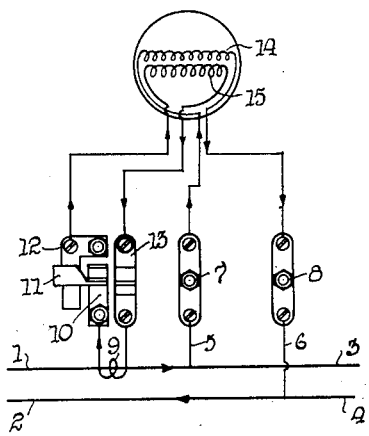
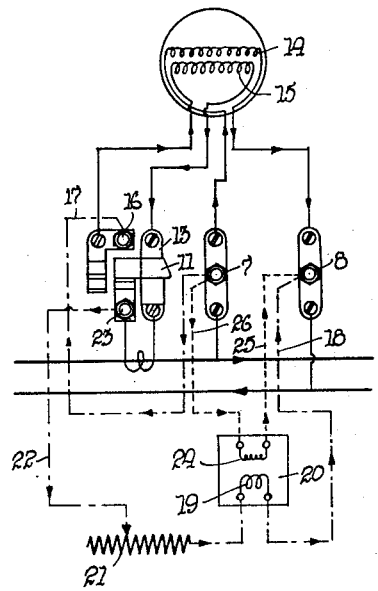
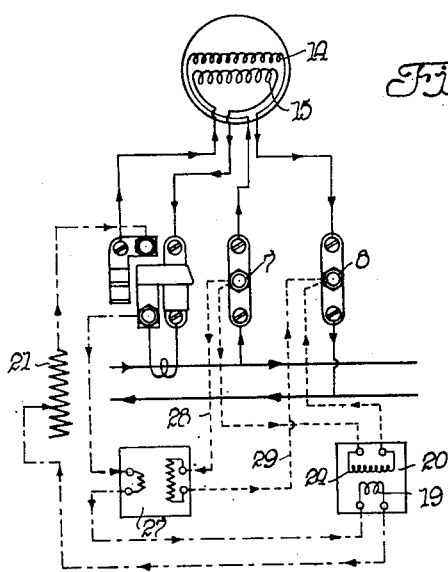
Inventor
Albert P. Ball
By Jones, Addington, Ames & Seibold
Attorneys June 15, 1926.  1,588,514
A. P. BALL
ELECTRICAL SYSTEM
Filed August 1, 1918   2 Sheets-Sheet 2
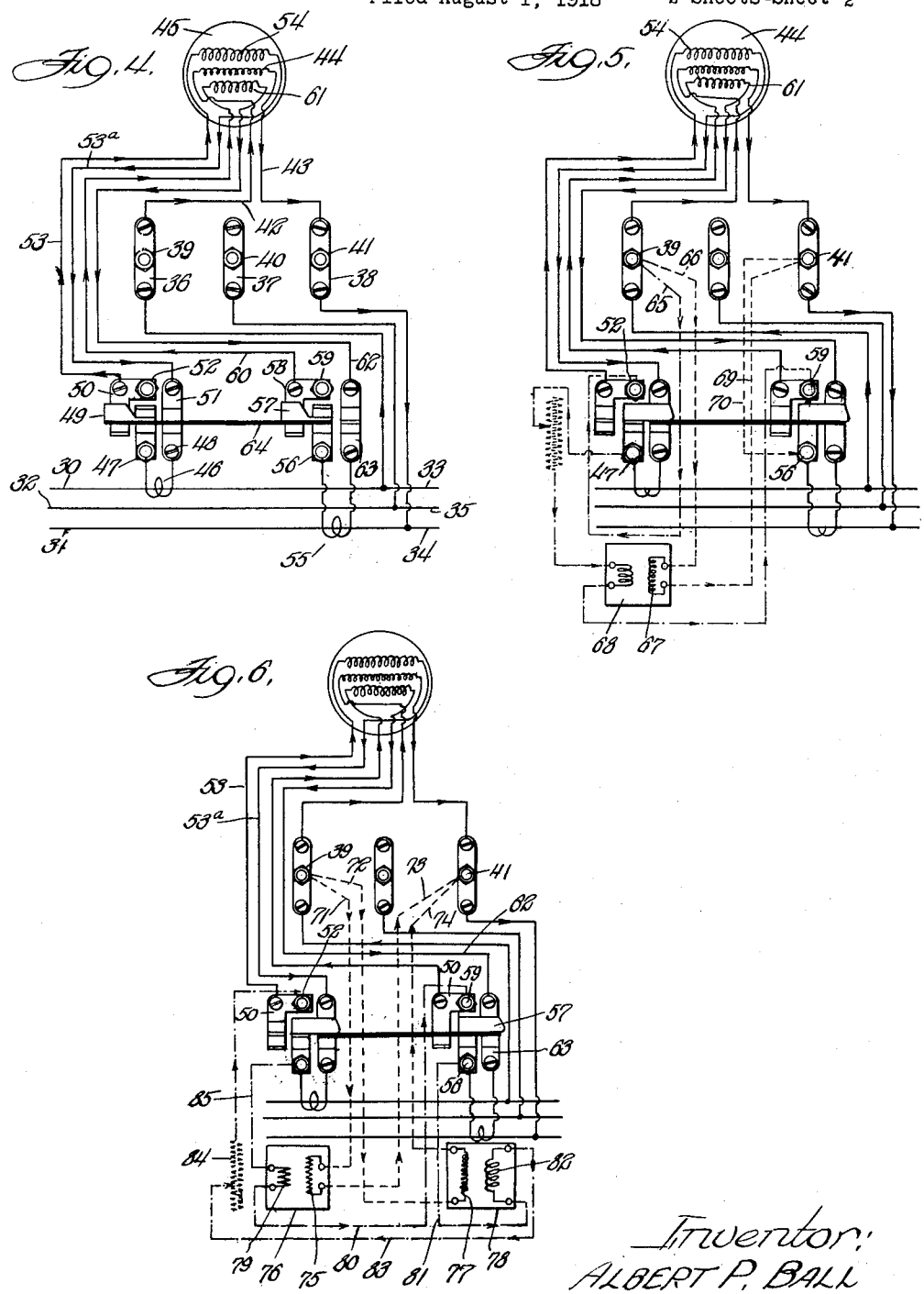
Inventor:
ALBERT P. BALL
By Jones, Addington, Ames & Seibold
Attys.

Patented June 15, 1926.

1,588,514

UNITED STATES PATENT OFFICE.

ALBERT P. BALL, OF ROYAL OAK, MICHIGAN, ASSIGNOR TO SQUARE D COMPANY, OF DETROIT, MICHIGAN, A CORPORATION OF MICHIGAN.

ELECTRICAL SYSTEM.

Application filed August 1, 1918. Serial No. 247,767.

My invention relates to electrical metered systems so arranged that the meter contained therein may be readily tested.

One of the objects of this invention is to so arrange the connections and elements of the electric system that meter testing connections may be made and circuits established without momentarily interrupting the customer's load.

A further object of this invention is to so design the system that a minimum number of switches may be employed to accomplish the desired result.

A further object of this invention is to design the system so that a number of different arrangements of testing circuits and testing means may be used with the same installation.

A further object of this invention is to generally simplify the means for establishing testing circuit connections.

A further object of this invention is to so arrange the circuits that the electrical installation is particularly adapted for single phase work.

A few of the many possible forms which this invention may take are shown in the accompanying drawings, in which—

Fig. 1 is a diagrammatic illustration of a single phase two wire system under normal or operating conditions.

Fig. 2 is a similar view of this installation arranged for meter testing by means of central station power and resistance load.

Fig. 3 is a similar view of this installation so arranged for meter testing that central station power and phantom load may be employed.

Fig. 4 is a diagrammatic view of a single phase three wire system under normal or operating conditions.

Fig. 5 is a view of this installation arranged for meter testing by means of central station power and resistance load; and Fig. 6 is a view of the same installation arranged for meter testing by means of central station power and phantom load.

Referring now to Figs. 1 and 2, it will be seen that this system comprises two main or line wires 1 and 2 which continue over and form the load wires 3 and 4, respectively. From these mains or wires 1 and 2 the potential coil of the meter is supplied by means of suitable taps 5 and 6. These taps have intermediate portions in the form of metallic members which carry central sockets 7 and 8, respectively. The series coil of the meter is supplied by means of a series or current transformer 9. The current from this transformer passes through the contact member 10 which carries a pivot switch blade 11 and in the normal operation, as shown in Fig. 1, passes out from the contact 12 to one side of the series coil of the meter and thence returns through the other contact 13 back to the series or current transformer 9 and thereby completes its auxiliary circuit. The potential coil is shown at 14 and the series coil is shown at 15 of the house meter or stationary meter. The contacts 12 and 13 are adapted to be engaged by the switch member or blade 11. In the position shown in Fig. 1, the switch member 11 connects the contacts 10 and 12 and completes the auxiliary circuit.

Referring to Fig. 2, it will be seen that when it is desired to test this house or stationary meter, connections are made by suitable plugs plugged into the sockets shown and establishing auxiliary or testing circuits and by short circuiting the series transformer or current transformer by means of the switch blade 11 and contact 13. A plug is placed into the socket 16 upon the contact member 12 and the cord from this plug leads down as shown at 17 and passes over to the plug in the socket 7 and establishes one of the connections to the mains. Another plug is placed in the socket 8 and has two leads therefrom, one passing down as shown at 18 through the series coil 19 of the test meter 20, through the test load or resistance 21, thence upwardly at 22 and into the plug in the socket 23 which is on the contact member 10. This establishes the testing circuit comprising the series coil 19 of the test meter, the variable resistance or test load 21 and the series coil 15 of the house meter or stationary meter, and forms a complete auxiliary circuit through which current is adapted to be passed without in any way interfering with the customer's load current. The potential coil 14 of the house meter has its connections unchanged and the potential coil 24 of the test meter 20 is connected by means of leads 25 and 26 with the sockets 8 and 7.

It will, of course, be understood that in all of the systems here shown a main line switch may be provided and suitable fuses in the system whereby the usual protection is afforded in electrical installations of this type, that is to say, the main line switch may be placed in the mains 1 and 2 and the fuses placed at such points, and further a separate switch or load switch may be placed in the mains 3 and 4, if so desired, and the same is true of the second or three wire installation here shown.

Referring now to Fig. 3 which shows a two wire single phase system adapted for meter testing by means of a phantom load, it will be seen that the test meter 20 has its potential coil 24 connected to the mains in the same manner as in Fig. 2. The series coil 19 of the test meter is supplied by means of the secondary of a transformer 27 and includes in its circuit the resistance or test load 21, as shown in Fig. 2, and also the series coil 15 of the house meter or stationary meter. The potential coil of the house meter is connected, as in Fig. 2. The primary of this transformer 27 is supplied from the mains through the medium of the taps 28 and 29 which go to the same plugs which cooperate with the sockets 7 and 8, respectively, which plugs, in this instance, also supply current for the potential coil of the test meter.

It will thus be seen that in this case, as shown in Fig. 3, if the meter is of a very large type it will not be necessary to draw excessive current from the mains to supply the customer's load and at the same time test the meter to its full capacity for by means of the transformer 27 a very much smaller current may be used in the primary circuit and a larger current in the secondary and a correspondingly smaller test load or resistance 21 may be used than in Fig. 2.

Referring now to Fig. 4 it will be seen that such figure shows an electrical installation for three wire systems. The outside mains are shown at 30 and 31 and the inside or neutral main is shown at 32. These wires or mains continue over and form the load side 33, 34 and 35, respectively. From these mains taps extend up to contact members 36, 37 and 38, which carry sockets 39, 40, and 41 respectively adapted to receive suitable testing plugs. From contact members 36 and 38 there extend the wires 42 and 43 to the potential coil 44 of the house and stationary meter 45. Two series meter or stationary meter 45. Two series transformers are here used, one shown at 46 having its terminals connected one to the testing socket 47 and the other to the contact member 48. Hingedly mounted on the same base as the testing socket 47 is a switch lever 49 of the double throw type which is adapted to contact with either contact member 50 or 51, and in the position shown contacts with the member 50. The member 50 carries a testing socket 52 and is connected by means of the wire 53 with one side of one series coil 54 of the house meter 45. The other side of this series coil passes down wire 53ª to the other contact member 51 and thence to the other terminal of this series transformer whose primary is in one side of the system, for instance, the main 30. The second series transformer is shown at 55 and has one terminal connected to a similar testing socket 56 carried on a central contact member which also carries a second switch blade or lever 57, which contacts with the contact member 58. This contact member 58 carries a testing socket 59 and is connected with one side of the second series coil of the house meter by means of the wire 60. The other side of this series coil 61 is connected by means of the wire 62 to a second contact member 63 which is connected to the other side of this series transformer. This second contact member 63 is adapted to co-operate during meter testing with the switch blade 57 in the same manner that the contact member 51 co-operates with the switch blade 49 during meter testing. The series transformer 55 has its primary in the other side 31 of the system, as shown.

The two switch blades 49 and 57 are connected by means of an insulating member or link 64 whereby both switch blades may be simultaneously operated.

Referring now to Fig. 5 it will be seen that this system has now been adapted for meter testing by means of a central power and resistance load. Into the socket 39 is plugged a member which carries two leads or wires 65 and 66. The wire 66 supplies the potential coil 67 of the testing meter 68. The other side of this potential coil is connected by means of a wire 69 and a plug co-operating with the socket 41. This second plug or the one co-operating with the socket 41 carries two wires 69, as noted, and 70. The wires 65 and 70 supply the testing circuit including the series coils of the meter to be tested, the resistance load and the series coil of the test meter. It will thus be seen that the meter in this case is tested by means of central power and resistance load, the potential coils of the meter to be tested and the testing meter, both being connected across the same points during the test, and the same current passing through the series coils of the meter to be tested and the testing meter. Either before or after the testing connections have been formed, the two switches indicated at 49 and 57 are thrown to the second position, as shown in Fig. 5, in which they short circuit each of the series transformers and also connect the contacts 51 and 63 with the respective central contacts of the two switches. This completes the testing connections and circuits so that the test may now be run.

Referring now to Fig. 6 wherein it will be seen that the test circuits are different from those shown in Fig. 5 and as here contemplated, testing of the meter, as shown in Fig. 6, is by means of a phantom load in place of a straight resistance load. In Fig. 6 it will be seen that the plug inserted into the socket member 39 carries two wires 71 and 72 and a plug inserted in the socket member 41 carries two wires 73 and 74. Upon reference to Fig. 6 it will be seen that the wires 71 and 73 supply the primary coil 75 of the transformer 76, and that the wires 74 and 72 supply the potential coil 77 of the testing meter 78. It will thus be seen that the point of connection of the potential coil of the testing meter is the same in this case as it was in that shown in Fig. 5. However, the series circuits of the house meter and testing meter include the secondary 79 of the transformer 76, and form therewith an auxiliary or closed circuit. This circuit includes, as stated, the secondary of the transformer and the current from thence passes along a wire 80 up to the socket 59 along wire 60, to the lower series coil of the house meter, returning by wire 62 to the contact 63 passing across to the plug 56 by means of the switch 57, which switch, together with the switch 49, have been thrown over to the position shown in Fig. 6, thence along a wire 81 through the series coil 82 of the testing meter 78 thence along a wire 83 through the variable resistance test load 84 to contact 50 thence along the wire 53 to the upper series coil of the house meter, returning by wire 53ª to contact 51 thence across to the socket 47 by means of the switch 49, thence along wire 85 again to the secondary of the transformer. It will be seen from the above that this establishes or constitutes a phantom load for the meter to be tested, and that the circuit traced out above is a closed auxiliary circuit and the current flowing therein is subject to any desired variation due to the testing resistance 84 which may be varied to suit the conditions during test.

It will be seen from the above that applicant has devised a very simple single phase system which may be either two wire or three wire, as shown, and that he has further provided a switch which is readily adapted to condition the meter for testing purposes independently of the customer's load, and that by means of suitable sockets and plugs and auxiliary circuits, many desirable testing conditions may be obtained, as noted above. It is well known that during certain periods of the day the load upon the power house or central station is very low. If it is desired to test a meter during this period, it may be tested by means of the central power and resistance load, as shown, for instance, in Figs. 2 and 5, in which case the full current used for testing purposes is drawn directly from the mains. When, however, it is desired to test the meter during the time when the power house is carrying its largest load, or in other words, during the peak of the load, it may be desirable to use a phantom load system for testing the meter, as shown, for instance, in Figs. 3 and 6. By this means it is possible to draw from the mains only a comparatively small current to supply the primary of the phantom load transformer and from the secondary to take as large a current as desired, as it is not necessary that this secondary supply be of a high voltage as there is very little resistance in the series coils of the meter, and the test load resistance may be varied to suit the conditions. By this means it will be seen that a very light load is placed upon the electrical system during meter testing.

It will be seen from the above description and drawings that applicant has devised a very simple and reliable meter testing system, which is very flexible and admits of varied uses to suit almost any condition desired.

It is to be understood that the above detailed description and drawings are to be intepreted in an illustrative sense only and not in a limiting sense as the invention is to be limited only as set forth in the following claims.

Having thus described my invention, what I claim as new and desire to secure by Letters Patent of the United States is:—

1. A meter testing block permitting the testing of a meter without requiring excessive current from the mains to supply the customers load and at the same time test the meter to its full capacity, comprising terminal straps arranged upon said block and provided with binding posts at their extremities for permanently connecting thereto a potential circuit and series coil of the meter, a contact in close proximity to certain of said terminal straps, said contact provided with a movable connector adapted to make and break contact betwen the last said terminal straps, line connections permanently connected to said contact and one of the last said terminal straps, all of said terminal straps provided with removable test connections for establishing a closed meter testing circuit which includes the primary and secondary connections of a phantom load, said meter testing circuit being established with the customers load disconnected therefrom upon a single movement of said movable connector.

2. A meter testing block comprising a plurality of terminal straps provided with binding posts at their extremities for permanently connecting thereto a potential circuit and series coil of the meter, a contact member disposed between two of said terminal straps and provided with a pivotally mounted electrical connector for alternately making and breaking circuit between the contact and the two terminal straps, and socket members on certain of said terminal straps and said contact for receiving meter test connections whereby a meter testing circuit may be established by the movement of said electrical connector to meter testing position.

3. A meter testing block comprising terminal straps arranged upon said block and provided with binding posts for permanently connecting thereto a potential circuit and series coils of a service meter, a contact in close proximity to certain of said terminal straps, said contact provided with a movable connector adapted to make and break contact between the last said terminal straps, all of said terminal traps provided with removable test connections for establishing a closed meter testing circuit which includes the primary and secondary connections of a phantom load, said meter testing circuit being established with the customer's load disconnected therefrom upon a single movement of said movable connector.

ALBERT P. BALL.